United States Patent
Ishida

[19]

[11] Patent Number: 6,116,214
[45] Date of Patent: Sep. 12, 2000

[54] THROTTLE VALVE CONTROLLER

[75] Inventor: Katsumi Ishida, Toyoake, Japan

[73] Assignee: Aisan Kogyo Kabushiki Kaisha, Japan

[21] Appl. No.: 09/014,419

[22] Filed: Jan. 27, 1998

[30] Foreign Application Priority Data

Feb. 27, 1997 [JP] Japan .................................. 9-044171

[51] Int. Cl.⁷ .............................. F02D 9/00; F02D 11/10
[52] U.S. Cl. ................... 123/399; 123/198 D; 73/118.1
[58] Field of Search ............................... 123/198 D, 361, 123/396, 397, 399, 479; 73/118.1

[56] References Cited

U.S. PATENT DOCUMENTS

| | | | |
|---|---|---|---|
| 5,260,877 | 11/1993 | Drobny et al. | 123/479 X |
| 5,339,782 | 8/1994 | Golzer et al. | 123/399 |
| 5,429,092 | 7/1995 | Kamei | 123/399 |
| 5,447,134 | 9/1995 | Yokoyama | 123/399 |
| 5,553,581 | 9/1996 | Hirabayashi et al. | 123/399 |
| 5,622,151 | 4/1997 | Lang | 123/399 |
| 5,669,353 | 9/1997 | Shirai et al. | 123/399 |

*Primary Examiner*—Tony M. Argenbright
*Attorney, Agent, or Firm*—Finnegan, Henderson, Farabow, Garrett & Dunner, L.L.P.

[57] ABSTRACT

The throttle valve controller 1 includes a failure detecting device 11 for detecting failures in the first and second accelerator sensors 2 and 3 based on the first input signal VAPS1 outputted from the first accelerator sensor 2 and the second input signal VAPS2 outputted from the second accelerator sensor 3. A control signal computing device 12 computes a first control signal T1 from the first and second input signals in response to the result of detection by the failure detecting device 11. A control signal correcting device effects primary delay processing on the first control signal T1, thereafter restricting the so-processed signal to a guard value or less and outputs the signal therefrom as a second control signal VAPS. A throttle control device 14 controls the degree of opening of the throttle valve 9 based on the second control signal VAPS.

22 Claims, 10 Drawing Sheets

THROTTLE VALVE CONTROLLER

BACKGROUND OF THE INVENTION

1. Field of the Invention

This invention relates to a throttle valve controller having means capable of coping with cases where failures have occurred in a plurality of accelerator sensors.

2. Description of the Related Art

A throttle valve control device or controller for electronically controlling the degree of opening of a throttle valve by a throttle actuator has been widely used in a recent vehicle. Since the throttle valve controller controls the degree of opening of the throttle valve while following the amount of depression of an accelerator pedal, the amount of depression of the accelerator pedal is measured by a corresponding accelerator sensor. Particularly when the accelerator sensor produces trouble for some reason, the vehicle might produce a dangerous driven state. Therefore, a plurality of accelerator sensors have heretofore been individually attached to the accelerator pedal.

Thus, when a failure or trouble has occurred in any of the plurality of accelerator sensors where the plurality of accelerator sensors are individually attached thereto, the subsequent treatment of this failure is very important from a safety standpoint. According to Japanese Patent Application Laid-Open No. 4-214949, for example, when trouble exists in two potentiometers equivalent to the aforementioned accelerator sensors, an electronic control device is deactivated or allowed to continue its function based on a signal outputted from the sensor thereof that is accurately functioning, thereby avoiding the occurrence of the dangerous driven state.

However, when an input value outputted from the other potentiometer falls within an improper range even when an input value outputted from one potentiometer falls within a normal or proper range, they lead no longer to a so-called double potentiometer configuration. There may be cases where the trouble of each potentiometer, which can be detected by making a comparison between the input values outputted from the two potentiometers, cannot be detected. Thus, even if the input value outputted from one potentiometer falls within the normal range, there may be cases in which the potentiometer cannot be determined or judged as being accurately functioning. That is, as has been described in Japanese Patent Application Laid-Open No. 4-214949, the dangerous driven state might not be avoided from occurring even if the electronic control device is caused to continue its function based on the signal outputted from the sensor that is accurately functioning.

SUMMARY OF THE INVENTION

With the foregoing problem in view, it is therefore an object of the present invention to provide a throttle valve controller capable of providing safety shunting driving by means of the other of two accelerator sensors when one of the two accelerator sensors fails.

According to one aspect of the present invention, for achieving the above object, there is provided a throttle valve controller for controlling the degree of opening of a throttle valve based on input signals outputted from at least two first and second accelerator sensors for individually detecting the amount of depression of an accelerator pedal, comprising failure detecting means for detecting failures in the first and second accelerator sensors based on the first input signal outputted from the first accelerator sensor and the second input signal outputted from the second accelerator sensor, control signal computing means for computing a first control signal from the first and second input signals in response to the result of detection by the failure detecting means, control signal correcting means for effecting primary delay processing on the first control signal, thereafter restricting the so-processed signal to a guard value or less and outputting the signal therefrom as a second control signal, and throttle control means for controlling the degree of opening of the throttle valve based on the second control signal.

In the throttle valve controller described above, when the first input signal and the second input signal coincide with each other where the first accelerator sensor and the second accelerator sensor are normal, either the first input signal or the second input signal is set as the second control signal.

In the throttle valve controller as well, when the first accelerator sensor and the second accelerator sensor are both faulty, a full-closing value for fully closing the throttle valve is set as the second control signal.

Further, in the aforementioned throttle valve controller, an upper degree of opening of the throttle valve, which corresponds to the guard signal, is equivalent to a degree of opening obtained by adding a predetermined amount to a degree of opening of the throttle valve, which is supposed from the present driving parameters.

Moreover, in the above throttle valve controller, the driving parameters comprise transmission gear positions and speeds.

In the aforementioned throttle valve controller, a velocity region in which the guard signal is held constant, is provided for each transmission gear position.

In the throttle valve controller having such a construction, when the first input signal outputted from the first accelerator sensor and the second input signal outputted from the second accelerator sensor coincide with each other where the failure detecting means does not detect the failures in the first accelerator sensor and the second accelerator sensor, the first accelerator sensor and the second accelerator sensor are not faulty. Therefore, the throttle control means controls the degree of opening of the throttle valve based on the first input signal or the second input signal. Further, since the first accelerator sensor and the second accelerator sensor are faulty when the failure detecting means has detected the failures in the first and second accelerator sensors, the throttle control means controls the degree of opening of the throttle valve based on the full-closing value for fully closing the throttle valve.

Since, on the other hand, the first accelerator sensor or the second accelerator sensor is faulty when the failure detecting means has detected the failure in the first or second accelerator sensor, the control signal computing means computes the first control signal in response to the result of detection by the failure detecting means. Since the first accelerator sensor is at fault when the failure detecting means has detected the failure in the first accelerator sensor, for example, the second input signal outputted from the second accelerator sensor is set as the first control signal. Since, on the other hand, the second accelerator sensor is faulty when the failure detecting means has detected the failure in the second accelerator sensor, the first input signal outputted from the first accelerator sensor is defined as the first control signal.

Further, when the first input signal outputted from the first accelerator sensor and the second input signal outputted from the second accelerator sensor do not coincide with each other even when the failure detecting means does not detect the failures in the first and second accelerator sensors, the first accelerator sensor or the second accelerator sensor fails to function in the normal manner. Therefore, the mean value of the first input signal and the second input signal is regarded as the first control signal.

The first control signal computed by the control signal computing means is subjected to the primary delay processing and thereafter limited to the guard value or less in the control signal correcting means. The so-processed signal is outputted to the throttle control means as a second control signal. The throttle control means controls the degree of opening of the throttle valve based on such a second control signal.

Since the first control signal is subjected to the primary delay processing at this time, the second control signal takes a value that gradually approaches the first control signal. Thus, the degree of opening of the throttle valve, which is controlled by the throttle control means, gradually changes from the present degree of opening to the degree of opening corresponding to the first control signal as in a step response of a primary delay element without suddenly changing from the present degree of opening to the degree of opening corresponding to the first control signal as in a step response. As a result, the degree of opening of the throttle valve gradually changes when either of the accelerator sensors fails (inclusive of the case where either of the accelerator sensors fails to function in the normal manner). Therefore, the behavior thereof at this time can be lessened. Further, the first control signal subjected to the primary delay processing is limited to the guard value or less. As a result, no runaway is produced because a restriction can be imposed on the degree of opening of the throttle valve, which gradually changes. In the case where the degree of opening of the throttle valve which corresponds to the guard value is set to a degree of opening obtained by adding a predetermined amount to a degree of opening of the throttle valve, which is assumed from the present driving parameters, the first control signal computed by the control signal computing means is less than or equal to the guard value even in the case of being subjected to the primary delay processing even if either one of the accelerator sensors produces an unusual event or fails to function in the normal manner, the throttle valve can be controlled from the present degree of opening to the degree of opening corresponding to the guard value if a driver depresses the accelerator pedal. Therefore, the vehicle speed can be gradually increased under the operation of the accelerator pedal. Since, however, the throttle valve is not opened to above the degree of opening corresponding to the guard value, the driver cannot increase the vehicle speed abruptly even if the driver extremely depresses the accelerator pedal. Incidentally, the present driving parameters may include transmission gear positions, vehicle speeds, engine speed, etc.

If the driver operates his/her brake pedal to decelerate the vehicle, then the throttle valve can be controlled to only the degree of opening obtained by adding a predetermined amount to the degree of opening of the throttle valve, which is assumed from its decelerated vehicle speed. Therefore, even if the driver depresses the accelerator pedal subsequently, the driver cannot increase the vehicle speed abruptly.

That is, in the throttle valve controller according to the present invention, when either one of the two accelerator sensors is made defective, the input signal outputted from the other thereof is limited to the guard value or less and subjected to the primary delay processing. Thereafter, the so-processed signal is outputted to the throttle control means where the degree of opening of the throttle valve is controlled. Therefore, safety shunting driving can be performed using the other accelerator sensor.

If the first input signal outputted from the first accelerator sensor does not coincide with the second input signal outputted from the second accelerator sensor when the failure detecting means does not detect the failures in the first and second accelerator sensors, then either the first accelerator sensor or the second accelerator sensor fails to function in the normal manner. It is thus desirable to perform the safety shunting driving. However, since it is unknown at this time whether either of the accelerator sensors is functioning in the normal manner, the first control signal computed from the first input signal and the second input signal is subjected to the primary delay processing and thereafter limited to the guard value or less. The restricted signal is outputted to the throttle control means where the degree of opening of the throttle valve is controlled. Thus, the safety shunting driving can be carried out by both the accelerator sensors.

If the velocity region in which the guard value is held constant, is provided for each transmission gear position, then the degree of opening of the throttle valve is held constant if the velocity region is reached even if the driver continues to depress the accelerator pedal so that the vehicle speed gradually increases, where either one of the two accelerator sensors is at fault or fails to function in the normal manner. Thus, since the vehicle speed does not reach a predetermined speed or above, the runaway can be prevented from occurring.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Figure 1:
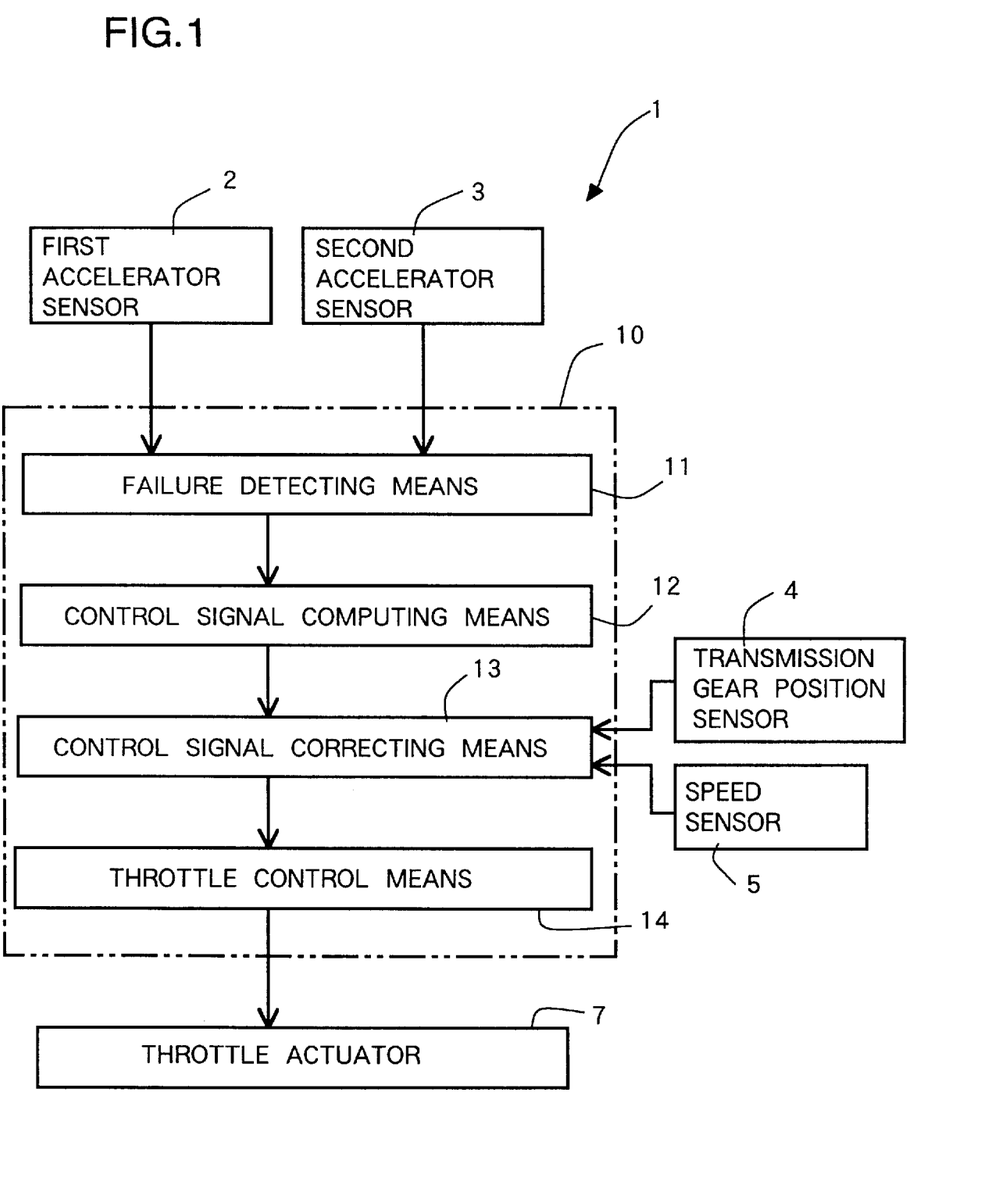
FIG. 1 is a block diagram showing a functional configuration of a throttle valve controller.
Figure 2:
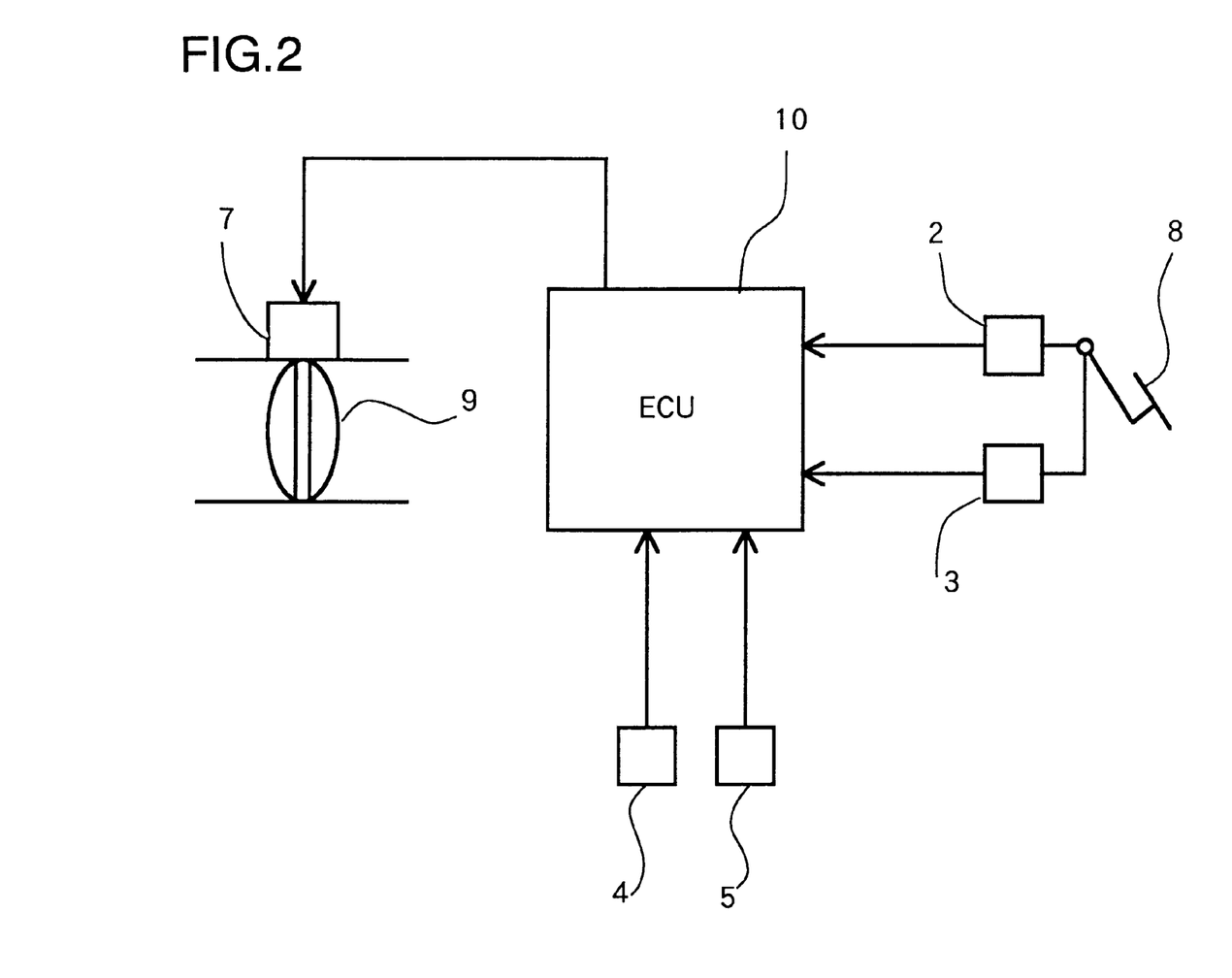
FIG. 2 is a block diagram illustrating a specific configuration of the throttle valve controller.

A throttle valve control device or controller showing an embodiment which embodies the present invention, will hereinafter be described in detail with reference to the accompanying drawings. FIG. 1 is a block diagram showing a functional configuration of a throttle valve control device or controller. FIG. 2 is a block diagram illustrating specific element configurations. As shown in FIG. 1, a first accelerator sensor 2 and a second accelerator sensor 3 are electrically connected to an ECU 10 of the throttle valve controller 1 according to the present embodiment. A first input signal outputted from the first accelerator sensor 2 and a second input signal delivered from the second accelerator sensor 3 are respectively converted into digital signals corresponding to the amount of depression of an accelerator pedal 8 (see FIG. 2).

Further, the ECU 10 has a failure detecting means 11, a control signal computing means 12, a control signal correcting means 13 and a throttle control means 14. The failure detecting means 11 is electrically connected to the first accelerator sensor 2 and the second accelerator sensor 3 and detects malfunctions or failures in the first and second accelerator sensors 2 and 3 in response to the first and second input signals. Further, the control signal computing means 12 is electrically connected to the failure detecting means 11 and computes a first control signal from the first and second input signals in association with the failure detecting means 11.

Further, the control signal correcting means 13 is electrically connected to the control signal computing means 12 and has an input-output relationship like a primary lag or delay element. That is, the control signal correcting means 13 outputs a control signal obtained by subjecting the input first control signal to primary delay processing to the throttle control means 14 to be described later. Moreover, the control signal correcting means 13 is connected even to a transmission gear position sensor 4 and a speed sensor 5 and sets a guard value while taking into consideration information based on signals input from the transmission gear position sensor 4 and the speed sensor 5 to thereby limit the first control signal subjected to the primary delay processing to the guard value or less. The control signal limited to such a guard value or less results in a second control signal. Incidentally, the primary delay processing and the setting of the guard value will be explained in detail later.

Further, the throttle control means 14 is electrically connected to the control signal correcting means 13. Moreover, the throttle control means 14 is also connected to a throttle actuator 7. The throttle control means 14 converts the second control signal outputted from the control signal correcting means 13 into a degree-of-opening signal required to open a throttle value 9 (see FIG. 2) and outputs a control output signal based on the request degree-of-opening signal to the throttle actuator 7.

Further, the throttle valve controller is comprised specifically of elements shown in FIG. 2. That is, the first accelerator sensor 2 and the second accelerator sensor 3 for detecting the amount of depression of the accelerator pedal 8 are linked to a bearing portion of the accelerator pedal 8 turned about the shaft and are rotatably attached thereto. Alternatively, they are attached to a rotatable shaft of a throttle lever in relation to the stroke of the accelerator pedal 8. In the present embodiment, potentiometers are used as the accelerator sensors 2 and 3.

As described above, the first accelerator sensor 2 and the second accelerator sensor 3 are connected to the ECU 10.

The ECU 10 converts the first input signal outputted from the first accelerator sensor 2 and the second input signal outputted from the second accelerator sensor 3 into the digital signals corresponding to the amount of depression of the accelerator pedal 8.

Further, the transmission gear position sensor 4 and the speed sensor 5 are connected to the ECU 10. Thus, the first input signal, the second input signal and the input signals outputted from the transmission gear position sensor 4 and the speed sensor 5 are inputted to the ECU 10.

Also connected to the ECU 10 is the throttle actuator 7 coupled to a rotatable shaft of the turnably-held throttle valve 9. The throttle valve 9 is intended to control the amount of supply of fuel air to an engine and is opened or closed by the throttle actuator 7.

The operation of the throttle valve controller having the above construction will next be described based on flowcharts. The operation of the throttle valve controller 1 according to the embodiment will be shown in FIGS. 3 and 4 in accordance with the flowcharts. Since the flowcharts are started up and processed each time the first input signal outputted from the first accelerator sensor 2 and the second input signal outputted from the second accelerator sensor 3 are respectively converted into the digital signals by the ECU 10, they are executed in cycle times ranging from 2 to 4 msecs.

Figure 3:
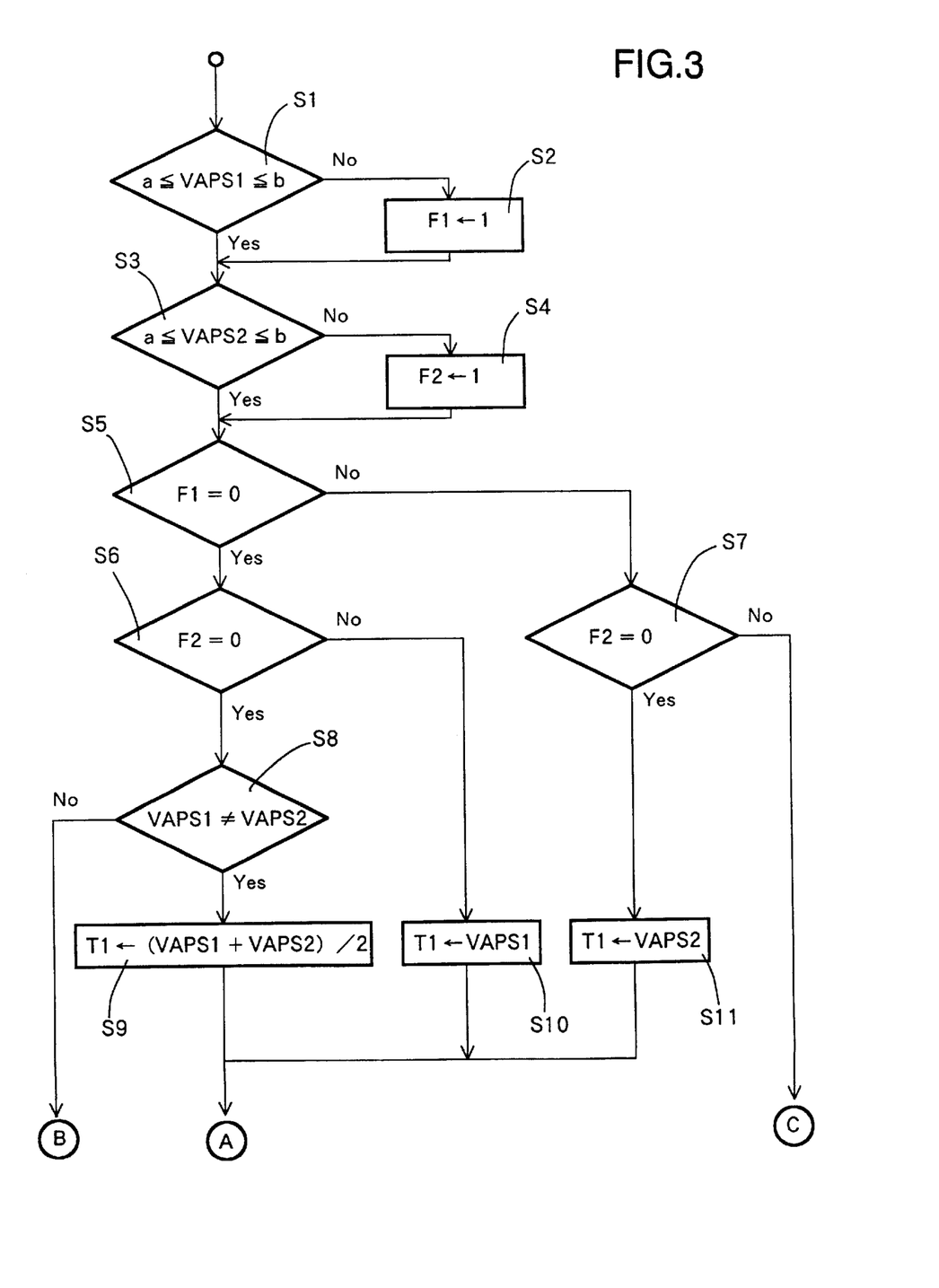
FIG. 3 is a flowchart for describing a method of controlling the throttle valve controller.

A first input signal VAPS1 outputted from the first accelerator sensor 2 is first compared with an upper limit value "a" and a lower limit value "b" to thereby detect whether the first accelerator sensor 2 is faulty (S1). If the failure in the first accelerator sensor 2 is not found (i.e., if the answer is found to be Yes in S1), then the routine procedure proceeds to S3. If the failure in the first accelerator sensor 2 is detected (i.e., if the answer is found to be No in S1), then a flag F1 indicative of the failure in the first accelerator sensor 2 is set from "0" to "1" and the routine procedure proceeds to S3.

Next, a second input signal VAPS2 outputted from the second accelerator sensor 3 is compared with the upper limit value "a" and the lower limit value "b" to thereby detect whether the second accelerator sensor 3 is at fault (S3). If the failure in the second accelerator sensor 3 is not detected (i.e., if the answer is found to be Yes in S3), then the routine procedure proceeds to S5. If the failure in the second accelerator sensor 3 is found out (i.e., if the answer is found to be No in S3), then a flag F2 indicative of the malfunction of the second accelerator sensor 3 is set from "0" to "1" and the routine procedure proceeds to S5.

A distinction between cases corresponding to the failures in the first accelerator sensor 2 and the second accelerator sensor 3 is made in accordance with the flags F1 and F2 in S5 to S7. That is, when both the first accelerator sensor 2 and the second accelerator sensor 3 are unfaulty, the flag F1 is "0" (i.e., the answer is found to be Yes in S5) and the flag F2 is also "0" (i.e., the answer is found to be Yes in S6). Therefore, the routine procedure proceeds to S8. When, on the other hand, only the second accelerator sensor 3 is at fault, the flag F1 is "0" (i.e., the answer is found to be Yes in S5) and the flag F2 is "1" (i.e., the answer is found to be No in S6). Therefore, the routine procedure proceeds to S10.

When only the first accelerator sensor 2 is faulty, the flag F1 is "1" (i.e., the answer is found to be No in S5) and the flag F2 is "0" (i.e., the answer is found to be Yes in S7). Therefore, the routine procedure proceeds to S11. When, on the other hand, both the first accelerator sensor 2 and the second accelerator sensor 3 are faulty, the flag F1 is "1" (i.e., the answer is found to be No in S5) and the flag F2 is also "1" (i.e., the answer is found to be No in S7). Therefore, the routine procedure proceeds to S19 shown in FIG. 4.

When the first accelerator sensor 2 and the second accelerator sensor 3 are both unfaulty, the first input signal VAPS1 outputted from the first accelerator sensor 2 is compared with the second input signal VAPS2 outputted from the second accelerator sensor 3 in S8. When the first input signal VAPS1 does not coincide with the second input signal VAPS2 (i.e., when the answer is found to be Yes in S8), the first accelerator sensor 2 or the second accelerator sensor 3 malfunctions or fails to operate in the normal manner and hence the routine procedure proceeds to S9. When the first input signal VAPS1 coincides with the second input signal VAPS2 (i.e., when the answer is found to be No in S8), the first accelerator sensor 2 and the second accelerator sensor 3 operates in the normal manner and hence the routine procedure proceeds to S17 shown in FIG. 4.

Next, a first control signal T1 is computed except for the case where the first accelerator sensor 2 and the second accelerator sensor 3 are both faulty and the case where they are not at fault. That is, when the first accelerator sensor 2 or the second accelerator sensor 3 fail to operate in the normal manner, the average or mean value of the first input signal VAPS1 and the second input signal VAPS2 is defined as the first control signal T1 in S9. When only the second accelerator sensor 3 is defective, the first input signal VAPS1 is determined as the first control signal T1 in S10. On the other hand, when only the first accelerator sensor 2 is defective, the second input signal VAPS2 is set as the first control signal in S11.

Figure 4:
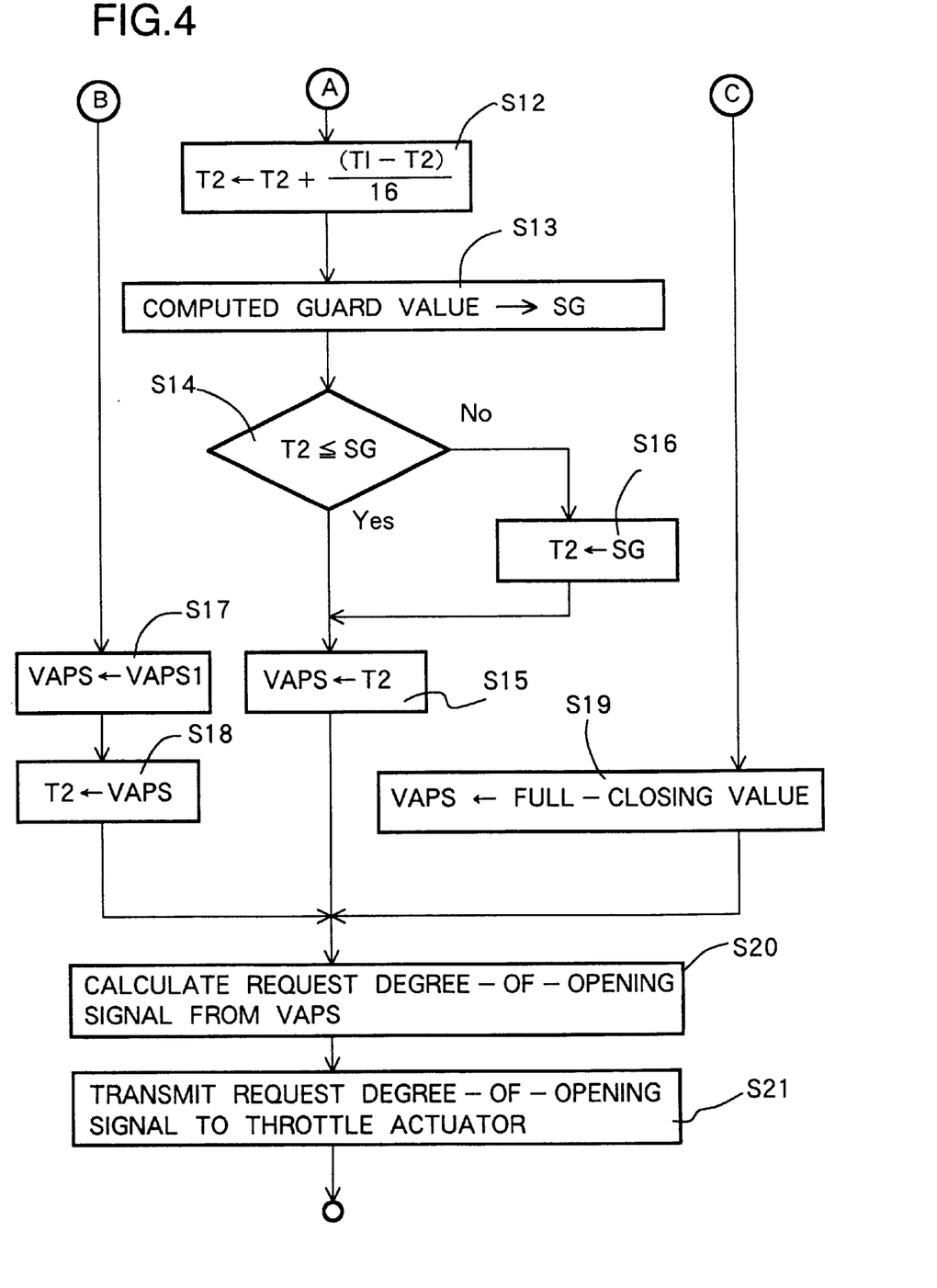
FIG. 4 is a flowchart for describing a method of controlling the throttle valve controller.

The routine procedure is next shifted to the flowchart shown in FIG. 4. The flowchart is processed in three parts: where the first accelerator sensor 2 and the second accelerator sensor 3 are both faulty (see C in FIG. 4), where both the first accelerator sensor 2 and the second accelerator sensor 3 are not faulty (see B in FIG. 4) and where the first control signal T1 is computed (see A in FIG. 4).

When the first accelerator sensor 2 and the second accelerator sensor 3 are both faulty (see C in FIG. 4), a full-closing value for fully closing the throttle valve 9 is stored in a second control value VAPS in S19. Next, a request degree-of-opening signal is calculated from the second control signal stored in the VAPS (S20) and a control output signal based on the request degree-of-opening signal is outputted to the throttle actuator 5 (S21). Thus, when both the first accelerator sensor 2 and the second accelerator sensor 3 are faulty, the throttle valve 9 can be controlled to its full closing.

When both the first accelerator sensor 2 and the second accelerator sensor 3 are not faulty (see B in FIG. 4), the first input signal VAPS1 is stored in the second control value VAPS in S17. At this time, the second input signal VAPS2 may be stored in the second control value VAPS. The second control value VAPS is stored in T2 as a control signal indicative of the present degree of opening of the accelerator pedal 8 (Sl8). A request degree-of-opening signal is calculated from the second control signal stored in VAPS (S20) and a control output signal based on the request degree-of-opening signal is outputted to the throttle actuator 5 (S21). Thus, when both the first accelerator sensor 2 and the second accelerator sensor 3 are not defective, the throttle valve 9 can be controlled based on either the first input signal VAPS1 or the second input signal VAPS2.

Figure 6:
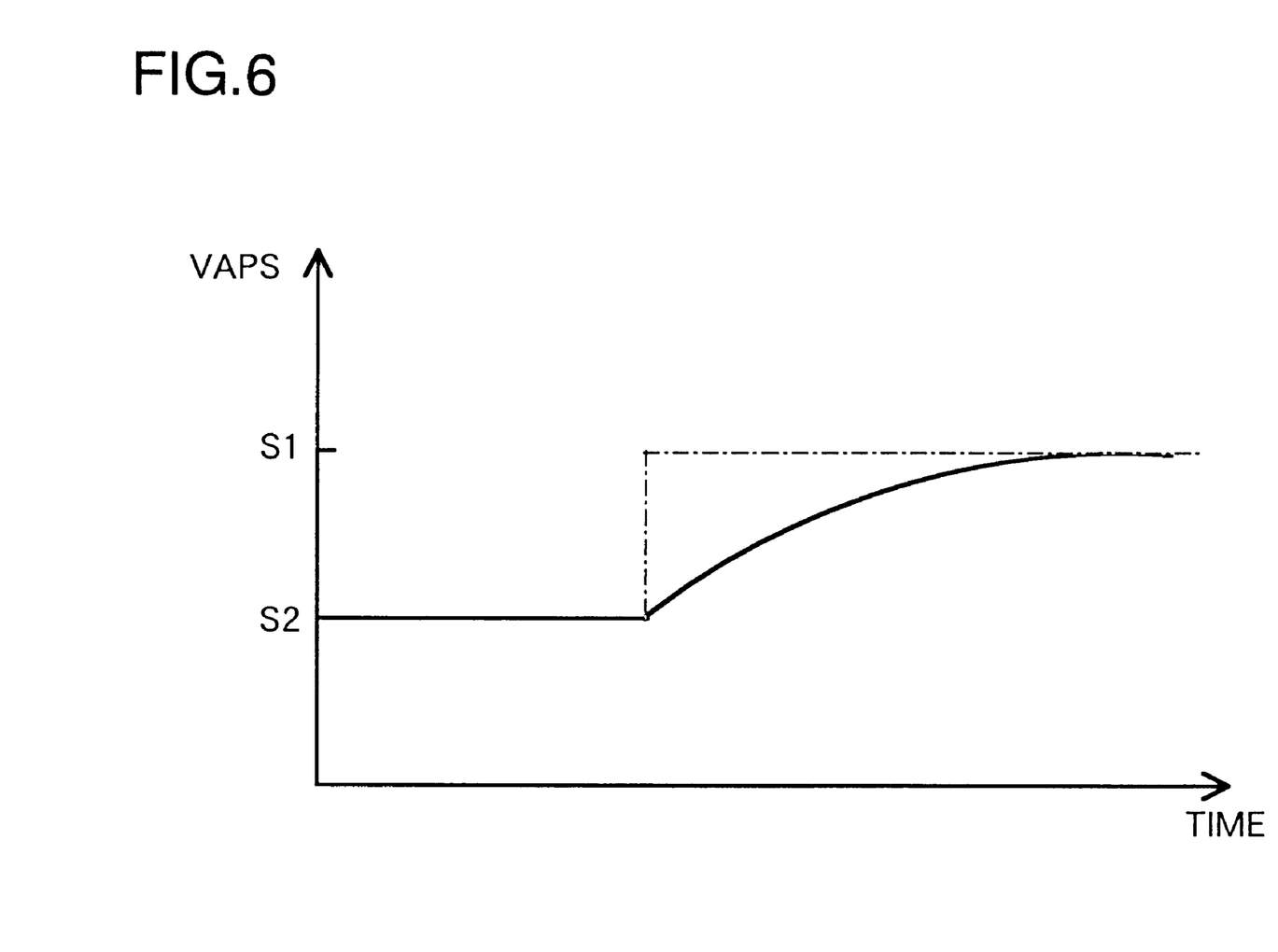
FIG. 6 is a diagram for describing a response subjected to primary delay processing shown in FIG. 4.

When the first control signal T1 is computed (see A in FIG. 4), the first control signal T1 is subjected to primary delay processing in S12. The present primary delay processing is executed by newly storing a control signal obtained by adding the control signal T2 to the quotient acquired by dividing the difference between the first control signal T1 and the control signal T2 by a numerical value "16", in T2. Incidentally, the numerical value employed in the primary delay processing is not necessarily limited to "16". FIG. 6 shows an example of a response subjected to the primary delay processing. The solid line in FIG. 6 indicates a response subjected to the primary delay processing and the dotted line in FIG. 6 indicates a response free of the primary delay processing. That is, when the first control signal T1 is computed in a given cycle, the VAPS converted into the request degree-of-opening signal gradually changes from the control signal T2 to the first control signal T1 in Steps subsequent to the next time as indicated by the solid line without suddenly changing the VAPS converted into the request degree-of-opening signal from the control signal T2 to the first control signal T1 on a step-responsive basis as indicated by the dotted line in S20.

Figure 5:
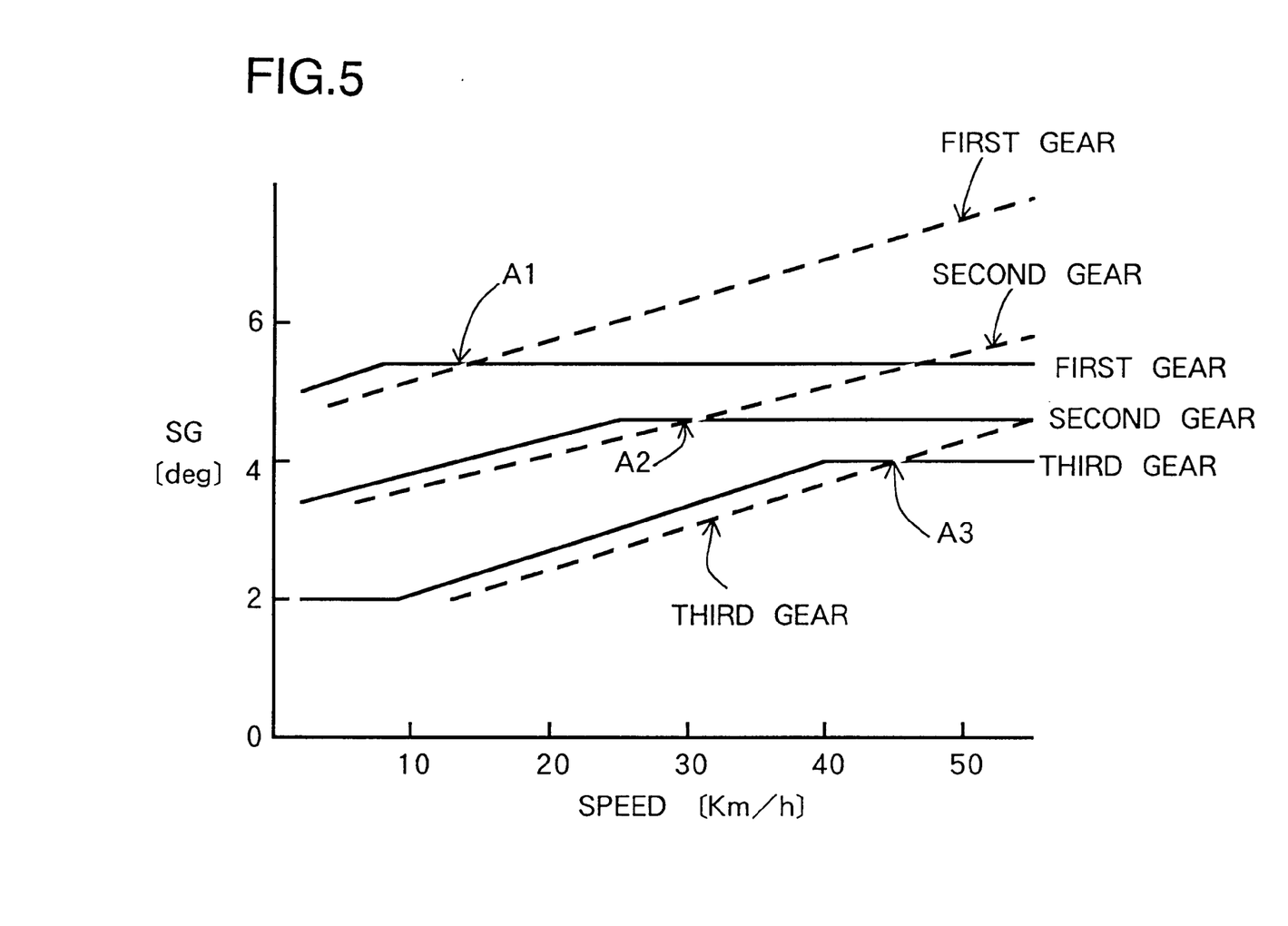
FIG. 5 is a diagram showing the relationship between transmission gear positions and upper limit guard values relative to the speed.

Next, a guard value is computed and stored in SG in S13. The guard value is computed in consideration of the present transmission gear position and vehicle speed as shown in FIG. 5. FIG. 5 is a diagram showing transmission gear positions and on-normal condition characteristics of the throttle valve 9 relative to the speed. The vertical axis of this diagram means or indicates the degree of opening of the throttle valve 9 controlled based on the guard value SG, and the horizontal axis thereof means or indicates the speed. That is, the guard value SG is set so as to correspond to each of the degrees of opening (indicated by solid lines in FIG. 5) obtained by adding predetermined amounts to the degrees of opening (indicated by dotted lines in FIG. 5) of the throttle valve 9 assumed from the present transmission gear position and speed.

Further, a velocity region for holding the guard value SG constant is provided for each transmission gear position as shown in FIG. 5. Thus, when the first control signal T1 is computed where a vehicle is running in first gear, the vehicle cannot be driven at a speed greater than or equal to a speed indicated by A1 in FIG. 5. When the first control signal T1 is computed where the vehicle is running in second gear, the vehicle cannot be driven at a speed greater than or equal to a speed indicated by A2 in FIG. 4. Further, when the first control signal T1 is computed where the vehicle is running in third gear, the vehicle cannot be driven at a speed greater than or equal to a speed indicated by A3 in FIG. 4. Incidentally, the present transmission gear position and speed are obtained from the input signals produced from the transmission gear position sensor 4 and the speed sensor 5.

In S14, the guard value computed and stored in SG in this way is compared with the control signal T2 obtained by effecting primary processing on the first control signal T1. Incidentally, the control signal T2 means a control signal leading to the foundation of the calculation of the previous request degree-of-opening signal (see FIG. 6). When the guard value stored in SG is greater than or equal to the control signal T2 (i.e., when the answer is found to be Yes in S14), a second control value is stored in VAPS with the control signal T2 as a second control signal in S15. Next, a request degree-of-opening signal is calculated from the second control signal stored in VAPS (S20). Thereafter, a control output signal calculated based on the such a request degree-of-opening signal is outputted to the throttle actuator 5 (S21).

When, on the other hand, the guard value stored in SG is not greater than or equal to the control signal T2 (i.e., when the answer is found to be No in S14), the guard value stored in SG is newly stored in T2. Further, the guard value newly stored in T2 is stored in VAPS (S15). Thereafter, a request degree-of-opening signal is calculated from the second control signal stored in VAPS (S20) and a control output signal calculated based on such a request degree-of-opening signal is outputted to the throttle actuator 5 (S21). Thus, when the first control signal T1 is computed, the degree of opening of the throttle valve 9 can be controlled based on the guard value SG or the second control signal VAPS.

In the throttle valve controller 1 according to the present embodiment, as has been described above in detail, when the first input signal VAPS1 outputted from the first accelerator sensor 2 coincides with the second input signal VAPS2 outputted from the second accelerator sensor 3 where the failure detecting means 11 does not detect the failures in the first accelerator sensor 2 and the second accelerator sensor 3, the first accelerator sensor 2 and the second accelerator sensor 3 are not faulty. Therefore, the throttle control means 14 controls the degree of opening of the throttle valve 9 based on the first input signal VAPS1 or the second input signal VAPS2 (see a routine path indicated by B in FIGS. 3 and 4). Since the first accelerator sensor 2 and the second accelerator sensor 3 are faulty when the failure detecting means 11 has detected the failures in the first accelerator sensor 2 and the second accelerator sensor 3, the throttle control means 14 controls the degree of opening of the throttle valve 9 based on the full-closing value for fully closing the throttle valve 9 (see a routine path indicated by C in FIGS. 3 and 4).

Since the first accelerator sensor 2 or the second accelerator sensor 3 are at fault when the failure detecting means 11 has detected the failure in the first accelerator sensor 2 or the second accelerator sensor 3, the control signal computing means 12 computes the first control signal T1 according to the result of detection. Since the first accelerator sensor 2 is faulty when the failure detecting means 11 has detected the failure in the first accelerator sensor 2, the second input signal VAPS2 outputted from the second accelerator sensor 3 is determined as the first control signal T1. On the other hand, since the second accelerator sensor 3 is at fault when the failure detecting means 11 has detected the failure in the second accelerator sensor 3, the first input signal VAPS1 outputted from the first accelerator sensor 2 is determined as the first control signal T1.

Further, when the first input signal VAPS1 outputted from the first accelerator sensor 2 does not coincide with the second input signal VAPS2 outputted from the second accelerator sensor 3 even when the failure detecting means 11 does not detect the failures in the first accelerator sensor 2 and the second accelerator sensor 3, either the first accelerator sensor 2 or the second accelerator sensor 3 does not operate in the normal manner. Therefore, the mean value of the first input signal VAPS1 and the second input signal VAPS2 is defined as the first control signal T1.

Further, the first control signal T1 computed by the control signal computing means 12 is subjected to the primary delay processing in the control signal correcting means 13, after which it is limited to the guard value SG or less. The so-processed control signal is outputted to the throttle control means 14 as a second control signal VAPS. The throttle control means 14 controls the degree of opening of the throttle valve 9 based on the second control signal VAPS (see a routine path indicated by A in FIGS. 3 and 4).

Since the first control signal T1 is subjected to the primary delay processing at this time (S12), the second control signal VAPS takes a value that gradually approaches the first control signal T1. Thus, the degree of opening of the throttle valve 9, which is controlled by the throttle control means 14, gradually changes from the present degree of opening to the degree of opening corresponding to the first control signal T1 as in the step response of the primary delay element without suddenly changing from the present degree of opening to the degree of opening corresponding to the first control signal T1 as in the step response (see FIG. 6). As a result, the degree of opening of the throttle valve 9 gradually changes when either the accelerator sensor 2 or 3 fails (inclusive of the case where either the accelerator sensor 2 or 3 fails to operate in the normal manner). Therefore, the behavior thereof at this time can be lessened. Further, the first control signal T1 subjected to the primary delay processing is limited to the guard value SG or less (S14). As a result, no runaway is produced because a restriction can be imposed on the degree of opening of the throttle valve 9, which gradually changes.

Now consider where the degree of opening of the throttle valve 9, which corresponds to the guard value SG, is set to the degree of opening obtained by adding a predetermined amount to the degree of opening of the throttle valve 9, which is assumed from the present driving parameters (see FIG. 5). When, in this case, the first control signal T1 computed by the control signal computing means 12 is less than or equal to the guard value SG even in the case of being subjected to the primary delay processing (i.e., when the answer is found to be Yes in S14) even if either the accelerator sensor 2 or 3 produces an unusual event or fails to operate in the normal manner, the throttle valve 9 can be controlled from the present degree of opening to the degree of opening corresponding to the guard value SG if the driver depresses the accelerator pedal 8. Therefore, the vehicle speed can be gradually increased under the operation of the accelerator pedal 8. Since, however, the throttle valve 9 is not opened to above the degree of opening corresponding to the guard value SG, the driver cannot increase the vehicle speed abruptly even if the driver extremely depresses the accelerator pedal 8. Incidentally, the present driving parameters include the transmission gear positions and the vehicle speed.

If the driver operates his/her brake pedal to decelerate the vehicle, then the throttle valve 9 can be controlled to only the degree of opening obtained by adding a predetermined amount to the degree of opening of the throttle valve 9, which is supposed from its decelerated vehicle speed. Therefore, even if the driver depresses the accelerator pedal 8 subsequently, the driver cannot increase the vehicle speed abruptly.

That is, when either one of the two accelerator sensors 2 and 3 is defective, the throttle valve controller 1 according to the present invention restricts the input signal outputted from the other thereof to the guard value SG or less and subjects it to the primary delay processing. Thereafter, the throttle valve controller 1 outputs the so-processed signal to the throttle control means 14 to control the degree of opening of the throttle valve 9. Therefore, safety shunting driving can be performed using the other accelerator sensor 2 or 3.

If the first input signal VAPS1 outputted from the first accelerator sensor 2 does not coincide with the second input signal VAPS2 outputted from the second accelerator sensor 3 when the failure detecting means 11 does not detect the failures in the first and second accelerator sensors 2 and 3, then either the first accelerator sensor 2 or the second accelerator sensor 3 fails to function in the normal manner. It is thus desirable to perform the safety shunting driving.

However, since it is unknown at this time whether either the accelerator sensor 2 or 3 is functioning in the normal manner, the first control signal T1 computed from the first input signal VAPS1 and the second input signal VAPS2 is subjected to the primary delay processing and thereafter limited to the guard value SG or less. The restricted signal is outputted to the throttle control means 14 where the degree of opening of the throttle valve 9 is controlled. Thus, the safety shunting driving can be carried out by both the accelerator sensors 2 and 3.

Since the velocity region in which the guard value SG is held constant, is provided for each transmission gear position (see FIG. 5), the degree of opening of the throttle valve 9 is held constant if the velocity region is reached even if the driver continues to depress the accelerator pedal 8 so that the vehicle speed gradually increases, where either one of the two accelerator sensors 2 and 3 is at fault or fails to function in the normal manner. Thus, since the vehicle speed does not reach a predetermined speed or above, a runaway can be prevented from occurring.

Incidentally, the present invention is not necessarily limited to the above-described embodiment. It will be apparent to one having ordinary skill in the art that many changes can be made thereto without departing from the spirit or scope of the invention as set forth therein.

In the throttle valve controller 1 according to the present embodiment, for example, the primary delay processing to be effected to the first control signal T1 is executed in S12 of FIG. 4 by newly storing in T2, the control signal obtained by adding the control signal T2 to the quotient produced by dividing the difference between the first control signal T1 and the control signal T2 by the numerical value "16". However, the primary delay processing may be executed by adding a predetermined amount to the control signal stored in T2 for each cycle time.

Figure 7:
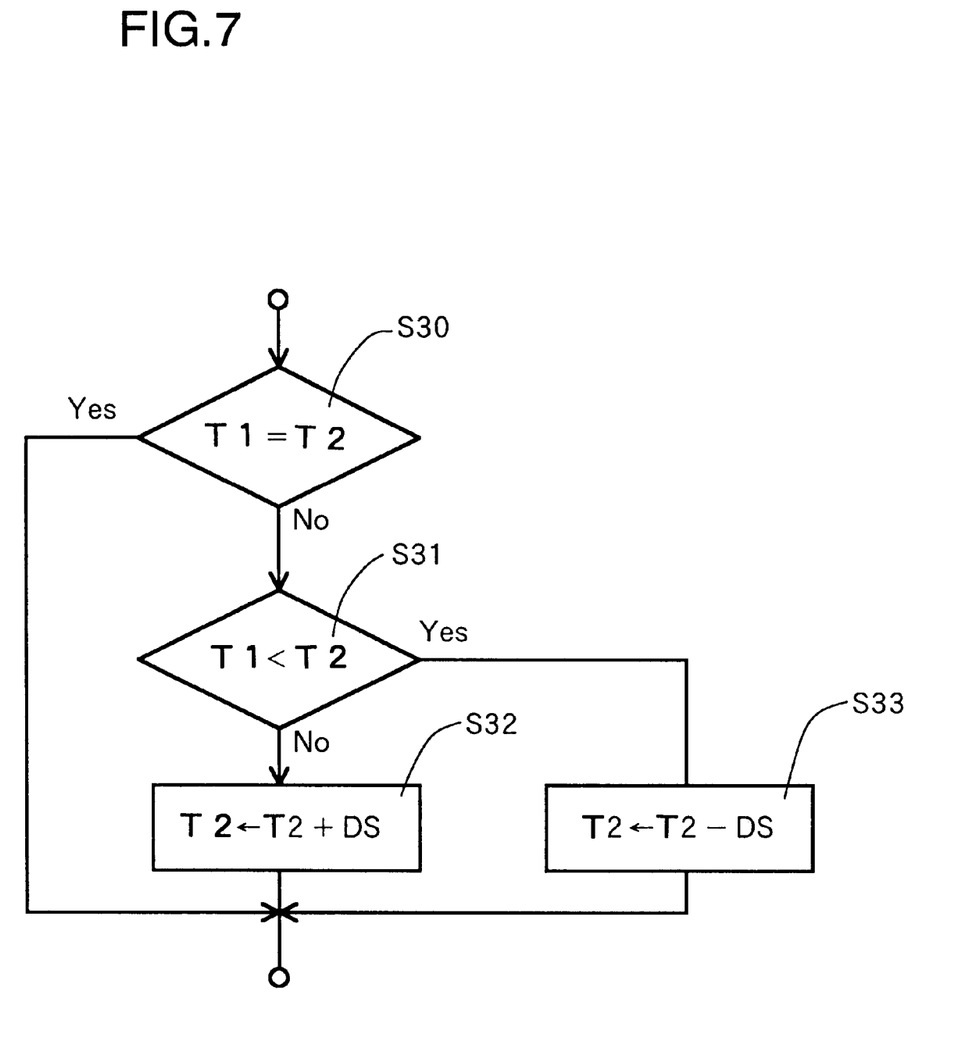
FIG. 7 is a diagram for describing another primary delay processing.

A flowchart at this time will be shown in FIG. 7. A process of S30 to S33 shown in FIG. 7 is performed in place of S12 shown in FIG. 4. That is, when the first control signal T1 is greater than the control signal T2 (i.e., when the answer is found to be No in S31) where the first control signal T1 is different from the control signal T2 (i.e., when the answer is found to be No in S30), a control signal obtained by adding a predetermined amount DS to the control signal T2 is newly stored in T2 (S32). When the first control signal T1 is smaller than the control signal T2 (i.e., when the answer is found to be Yes in S31), a control signal obtained by subtracting the predetermined amount DS from the control signal T2 is newly stored in T2 (S33). When, on the other hand, the first control signal T1 is identical to the control signal T2 (i.e., when the answer is found to be No in S30), no processing is done.

Figure 8:
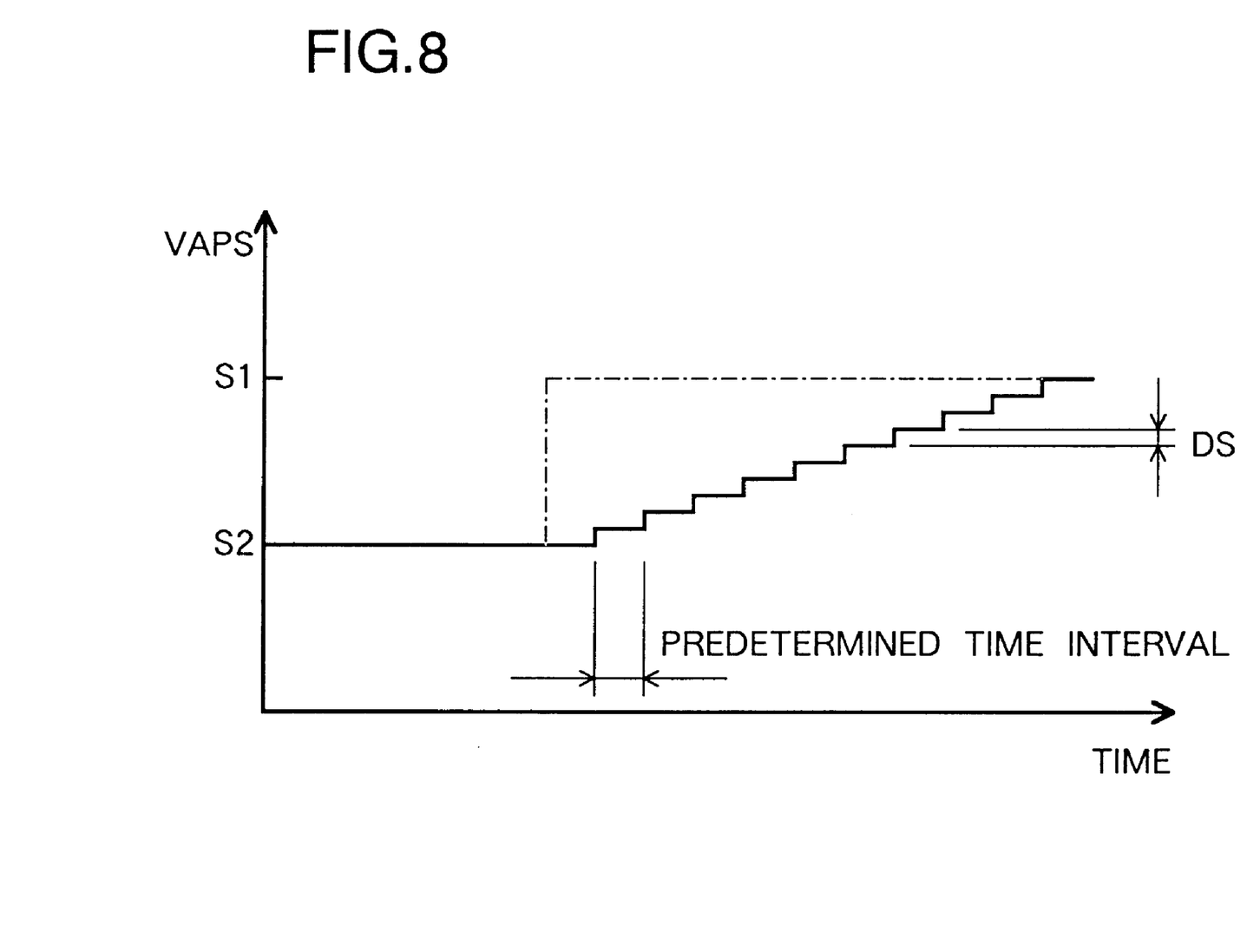
FIG. 8 is a diagram for describing a response subjected to the primary delay processing shown in FIG. 7.

FIG. 8 shows an example of a response subjected to the above primary delay processing. The solid line in FIG. 8 indicates a response subjected to the primary delay processing and the dotted line in FIG. 8 indicates a response free of the primary delay processing. That is, the response is gradually changed stepwise from the control signal T2 to the first control signal T1 in Steps subsequent to the next time as indicated by the solid line in FIG. 8. Incidentally, a predetermined time interval shown in FIG. 8 is equivalent to the cycle time.

Figure 9:
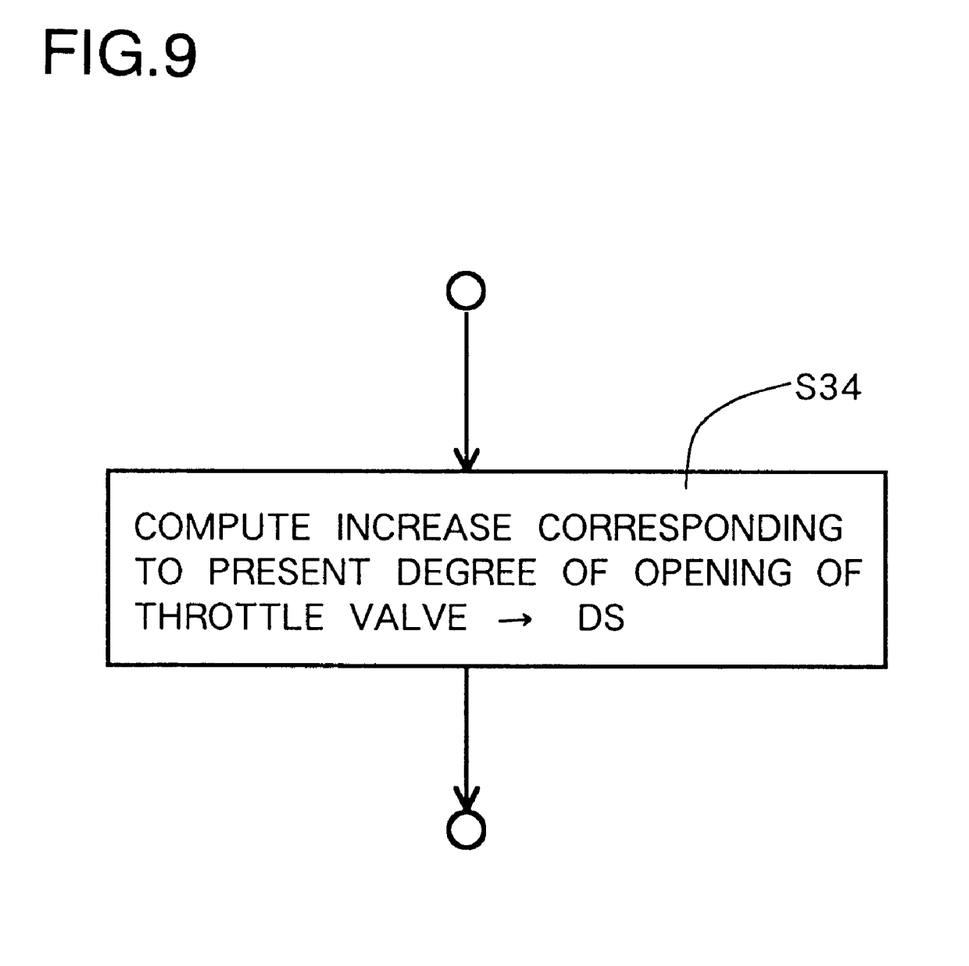
FIG. 9 is a symbol in the flowchart employed in the primary delay processing shown in FIG. 7.
Figure 10:
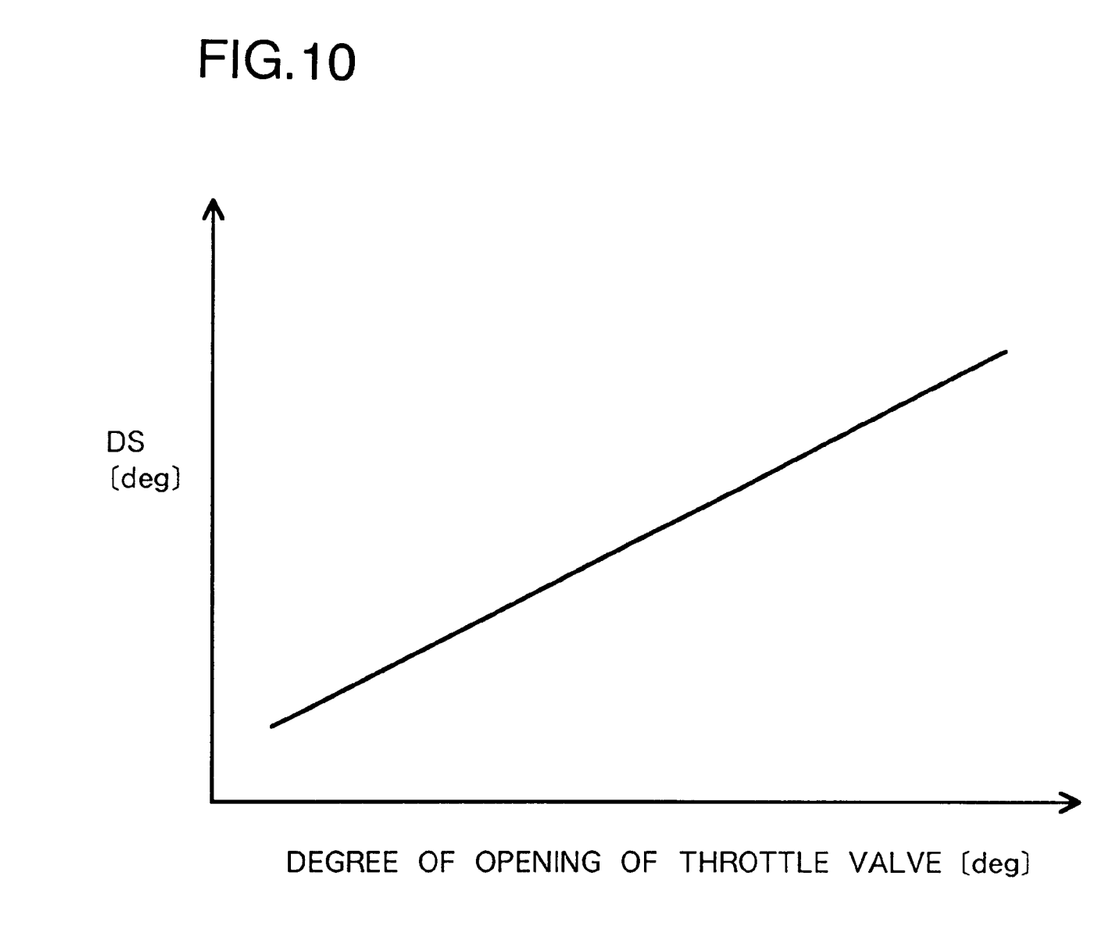
FIG. 10 is a diagram showing the relationship between the degree of opening of a throttle valve and a fixed value.

If a process in S34 shown in FIG. 9 is executed prior to S30 shown in FIG. 7, then the aforementioned predetermined amount DS can be changed as shown in FIG. 10 according to the present degree of opening of the throttle valve 9. Therefore, the predetermined amount DS can be relatively lowered upon a low degree of opening at which the engine is sensitive to a change in air quantity, whereas the predetermined amount DS can be relatively increased upon a high degree of opening at which the engine is insensitive to the change in air quantity.

In the throttle valve controller 1 according to the present embodiment, both the present speed and transmission gear position are taken into consideration in S13 shown in FIG. 4 upon computing the guard valve SG. However, the guard value SG may be calculated in consideration of only the present speed. Alternatively, the guard value SG may be calculated in consideration of only the present transmission gear position. Further, the present engine speed may be used in place of the present speed.

In the throttle valve controller according to the present invention, when one of the two accelerator sensors is made detective, the input signal outputted from the other accelerator sensor is limited to the guard value or less and subjected to the primary delay processing. Thereafter, the so-processed signal is outputted to the throttle control means where the degree of opening of the throttle valve is controlled. It is therefore feasible to perform the safety shunting driving with the other accelerator sensor.

Further, when the first input signal outputted from the first accelerator sensor and the second input signal outputted from the second accelerator sensor do not coincide with each other where the failure detecting means does not detect the failures in the first accelerator sensor and the second accelerator sensor, the first accelerator sensor or the second accelerator sensor fails to function in the normal manner. It is thus desirable to perform the safety shunting driving. However, since it is unknown at this time whether or either of the accelerator sensors functions in the normal manner, the first control signal computed from the first input signal and the second input signal is subjected to the primary delay processing and thereafter limited to the guard value or less. The so-processed signal is outputted to the throttle control means where the degree of opening of the throttle valve is controlled. Thus, the safety shunting driving can be performed by both the accelerator sensors.

If the velocity region in which the guard value is held constant, is provided for each transmission gear position, then the degree of opening of the throttle valve is held constant if the velocity region is reached even if the driver continues to depress the accelerator pedal so that the vehicle speed gradually increases, where either one of the two accelerator sensors is at fault or fails to function in the normal manner. Thus, since the vehicle speed does not reach the predetermined speed or above, the runaway can be prevented from occurring.

What is claimed is:

1. A throttle valve controller for controlling the degree of opening of a throttle valve based on input signals outputted from at least first and second accelerator sensors for individually detecting the amount of depression of an accelerator pedal, comprising:

failure detecting means for detecting failures in said first and second accelerator sensors by comparing each of the first input signal outputted from said first accelerator sensor and the second input signal outputted from said second accelerator sensor and predetermined upper and lower limit values;

control signal computing means for computing a first control signal from the first and second input signals in response to the result of detection by said failure detecting means;

control signal correcting means for effecting primary delay processing on the first control signal, thereafter restricting the so-processed signal to a guard value or less and outputting the signal therefrom as a second control signal; and throttle control means for controlling the degree of opening of said throttle valve based on the second control signal.

2. A throttle valve controller according to claim 1, wherein said control signal computing means computes the first control signal only when said failure detecting means has detected that either one of said first and second accelerator sensors is faulty.

3. A throttle valve controller according to claim 2, wherein said control signal computing means computes the mean value of the first and second input signals as the first control signal when the first and second input signals are inconsistent with each other.

4. A throttle valve controller according to claim 2, wherein said control signal computing means determines the second input signal as the first control signal when said failure detecting means has detected that said first accelerator sensor is at fault, and determines the first input signal as the first control signal when said failure detecting means has detected that said second accelerator sensor is faulty.

5. A throttle valve controller according to claim 3, wherein said control signal correcting means adds a predetermined control value to the quotient obtained by dividing the difference between the first control signal and the predetermined control value corresponding to the degree of opening of said throttle valve by a predetermined number to thereby perform the primary delay processing.

6. A throttle valve controller according to claim 5, wherein said predetermined number is set to 16.

7. A throttle valve controller according to claim 5, further including a transmission gear position sensor and a speed sensor and wherein a predetermined relationship is established between each of gear positions detected by said transmission gear position sensor and each of speeds detected by said speed sensor in advance.

8. A throttle valve controller according to claim 7, wherein said control signal correcting means computes a guard value on the basis of the predetermined relationship between the gear position and the speed.

9. A throttle valve controller according to claim 8, wherein an upper degree of opening is set to said throttle valve in association with the guard value, said upper degree of opening being set to a degree of opening obtained by adding a predetermined amount to a degree of opening of the throttle valve, which is assumed from said predetermined relationship.

10. A throttle valve controller according to claim 9, wherein said guard value is provided with a velocity region in which the guard value is held constant, for each said gear position.

11. A throttle valve controller according to claim 8, wherein said control signal correcting means compares the control value with the guard value and determines the control value as the second control signal when the control value is less than or equal to the guard value.

12. A throttle valve controller according to claim 8, wherein said control signal correcting means compares the control value with the guard value and determines the guard value as the second control signal when the control value is greater than the guard value.

13. A throttle valve controller according to claim 4, wherein said control signal correcting means adds a predetermined control value to the quotient obtained by dividing the difference between the first control signal and the predetermined control value corresponding to the degree of opening of said throttle valve by a predetermined number to thereby perform the primary delay processing.

14. A throttle valve controller according to claim 13, further including a transmission gear position sensor and a speed sensor and wherein a predetermined relationship is established between each of gear positions detected by said transmission gear position sensor and each of speeds detected by said speed sensor in advance.

15. A throttle valve controller according to claim 14, wherein said control signal correcting means computes a guard value on the basis of the predetermined relationship set between the gear position and the speed.

16. A throttle valve controller according to claim 15, wherein an upper degree of opening is set to said throttle valve in association with the guard value, said upper degree of opening being set to a degree of opening obtained by adding a predetermined amount to a degree of opening of the throttle valve, which is assumed from said predetermined relationship.

17. A throttle valve controller according to claim 16, wherein said guard value is provided with a velocity region in which the guard value is held constant, for each said gear position.

18. A throttle valve controller according to claim 15, wherein said control signal correcting means compares the control value with the guard value and determines the control value as the second control signal when the control value is less than or equal to the guard value.

19. A throttle valve controller according to claim 15, wherein said control signal correcting means compares the control value and the guard value and determines the guard value as the second control signal when the control value is greater than the guard value.

20. A throttle valve controller for controlling the degree of opening of a throttle valve based on input signals outputted from at least first and second accelerator sensors for individually detecting the amount of depression of an accelerator pedal, comprising:

failure detecting means for detecting failures in said first and second accelerator sensors by directly comparing a first value of the first input signal outputted from said first accelerator sensor with a second value of the second input signal outputted from said second accelerator sensor and determining whether the first value coincides with the second value;

control signal setting means for setting one of the first and second input signals as a control signal when said failure detecting means determines that said first and second accelerator sensors are normal and the first and second input signals coincide with each other; and throttle control means for controlling the degree of opening of said throttle valve based on the control signal.

21. A throttle valve controller for controlling the degree of opening of a throttle valve based on input signals outputted from at least first and second accelerator sensors for individually detecting the amount of depression of an accelerator pedal, comprising:

failure detecting means for detecting failures in said first and second accelerator sensors based on the first input signal outputted from said first accelerator sensor and the second input signal outputted from said second accelerator sensor;

control signal computing means for computing a first control signal from the first and second input signals when said failure detecting means had determined that one of said first and second accelerator sensors is faulty;

process means for processing the first control signal into a second control signal which is different from the first control signal;

full-closing value setting means for controlling said throttle valve to a full-closed state when said failure detecting means has determined that said first accelerator sensor and said second accelerator sensor are both faulty; and throttle control means for controlling the degree of opening of said throttle valve based on the second control signal when determined by the failure detecting means that one of said first and second accelerator sensors is faulty and based on the full-closing value set by said full-closing value setting means when determined by the failure detecting means that the first and second accelerator sensors are both faulty.

22. A throttle valve controller for controlling the degree of opening of a throttle valve based on input signals outputted from at least first and second accelerator sensors for individually detecting the amount of depression of an accelerator pedal, comprising:

failure detecting means for detecting failures in said first and second accelerator sensors by directly comparing a first value of the first input signal outputted from said first accelerator sensor with a second value of the second input signal outputted from said second accelerator sensor and determining whether the first value coincides with the second value;

control signal computing means for computing a first control signal from the first and second input signals when said failure detecting means has determined that one of said first and second accelerator sensors is faulty;

control signal correcting means for effecting primary delay processing on the first control signal, thereafter restricting the so-processed signal to a guard value or less and outputting the signal therefrom as a second control signal; and throttle control means for controlling the degree of opening of said throttle valve based on the second control signal.

* * * * *